Patented Apr. 8, 1952

2,592,502

UNITED STATES PATENT OFFICE 2,592,502

LACQUER COMPOSITIONS CONTAINING THE ROSIN ESTER OF 2,2,6,6-TETRAMETHYL-OLCYCLOHEXANOL

Harold Wittcoff and Wesley A. Jordan, Minneapolis, Minn., assignors to General Mills, Inc., a corporation of Delaware No Drawing. Application October 21, 1949, Serial No. 122,836

6 Claims. (Cl. 106—172)

The invention relates to highly useful and desirable lacquer compositions which owe their unusual properties to the presence of the rosin ester of 2,2,6,6-tetramethylolcyclohexanol, hereinafter referred to as TMC.

Nitrocellulose is a present-day article of commerce with multiple uses as, for example, in dynamite, smokeless powder, plastics, films and protective coatings. It is with the improvement of the last use that the present invention is primarily concerned. Nitrocellulose lacquers find extensive application as automobile and railroad car finishes, furniture coatings, paper coatings, leather dopes, gasket lacquers, and as protective coatings for other articles which require quick-drying durable finishes. In general, the nitrocellulose and other ingredients are dispersed uniformly in a solvent or a mixture of solvents, and are applied in this dispersed form to a surface by brushing, spraying or dipping. Thereupon, the solvent evaporates to leave a dry film which adheres to wood, metal or glass and forms a clear, resistant protective coating.

The coating is a desirable one, however, only when the lacquer has been properly formulated, for a solution of nitrocellulose alone dries to yield a taut, wrinkled film. To rectify this improper formulation, the art records that numerous substances may be added. These substances serve to add placticity and smoothness to the film, to give more solids content to the solution, and to provide more substance to the resulting film. One of the most common additives is ester gum, the glycerol ester of rosin, which is employed in conjunction with conventional plasticizers. It has long been known, however, that certain obvious disadvantages are attendant the use of ester gum. In the first place, it is impossible to use a quantity greater than the amount of nitrocellulose present since ester gum has no innate film-forming properties. In the second place, even when modest amounts are used, the resulting film is definitely softer and much less mar-resistant than the film from the unmodified nitrocellulose. Nonetheless, ester gum is widely used because it is the only relatively inexpensive material available, despite the fact that it imparts the above-mentioned defects to the film.

There are, in the literature, records of attempts to improve the above-mentioned defects by substituting for ester gum the rosin ester of pentaerythritol. As the examples below indicate, this is entirely lacking in feasibility since the rosin ester of pentaerythritol is incompatible with the nitrocellulose, and produces films which are "fogged" or "blushed."

Further lack of applicability of pentaerythritol-rosin ester in nitrocellulose lacquers is demonstrated in U. S. Patent 2,459,581 granted to F. G. Oswald. Here it is stated the pentaerythritol-rosin esters alone or when modified with maleic anhydride "are incompatible or only partly compatible with such film-forming materials as nitrocellulose and ethyl cellulose and thus cannot be used therewith except in a very limited way."

The present invention describes a substance capable of being formulated into nitrocellulose lacquers, which preserves the good features of ester gum, and at the same time eliminates the undesirable ones. Strangely enough, it was found that the rosin ester of TMC is entirely compatible with nitrocellulose in the presence of conventional plasticizers—an observation totally unexpected in view of the fact that pentaerythritol-rosin ester is not compatible either in the presence or absence of a plasticizer. Ordinarily one would assume that pentaerythritol-rosin ester is not compatible with nitrocellulose because the pentaerythritol component of the ester has a higher functionality than does the glycerol of the ester gum. Yet, TMC-rosin ester is made from a polyhydric alcohol which has a functionality even greater than pentaerythritol. The TMC-rosin ester nonetheless proved to be highly compatible. Thus lacquer compositions could be prepared with high solids content, which yielded films with excellent adhesion to glass, metal, wood or other surfaces.

Two very important advantages are associated with the use of TMC-rosin ester in nitrocellulose lacquers. These are best understood by reference to the limiting factors attendant the use of ester gum. In the first place ester gum detracts markedly from the hardness and mar-resistance of the nitrocellulose films. In the second place, it cannot be used in quantities greater than the amount of nitrocellulose used. Both of these limiting factors are overcome by the use of TMC-rosin ester. Thus, the first great advantage is this: When TMC-rosin ester is substituted for ester gum in a standard lacquer formulation, the resulting film exhibits more gloss and is at least 50 per cent harder without sacrifice of flexibility and abrasion resistance. In addition, it is important to note that the use of TMC-rosin ester in the place of ester gum in lacquer formulations does not increase the viscosity of the solution. The second great advantage is that TMC-rosin ester may be used in quantities twice as great as the amount of nitrocellulose used. When similar quantities of ester gums are used, soft, "cheesy" films result. By using such large quantities of TMC-rosin ester, certain advantages were immediately noted. In the first place, this makes possible the preparation of lacquer solutions of high solids content. Thus, for many purposes, the number of coats applied can be substantially reduced. In the second place, use of large quantities of TMC-rosin ester reduces the viscosity of the solution. This is especially desirable since high viscosities have always been an undesirable feature of nitrocellulose solutions. In the third place, these solutions, containing large quantities of TMC-rosin ester, demonstrate a high tolerance for plasticizers. Thus, highly flexible films may be produced which, because of the presence of the TMC-rosin ester, demonstrate very great hardness. These films adhere well to surfaces and possess high gloss and actually show better solvent release than lacquer compositions containing ester gum. The ability to use large quantities of TMC-rosin ester makes it possible to vary within wide limits the solids content of the composition. Thus it is possible to vary the properties of the resultant films so that they might better suit the application for which they are intended. At the same time, the use of TMC-rosin ester in large quantities is desirable since it affects very favorably the price of the final composition, the rosin ester being less expensive than nitrocellulose.

Still another advantage inherent in the use of TMC-rosin ester in the present application is its wide range of solubility, especially in the less expensive of the so-called lacquer solvents. In this regard it may be sharply contrasted with similar compositions such as the rosin ester of pentaerythritol which is but sparingly soluble in many solvents.

In addition to greatly improved hardness and abrasion resistance, there are still other advantages inherent in the use of the rosin ester of TMC in lacquers. The resulting films possess high tensile strength and may be plasticized to high flexibility. They are capable of considerable elongation and have a high softening point.

It is therefore a principal object of the present invention to provide a lacquer composition containing nitrocellulose and the rosin ester of TMC as the principal solid constituents.

It is a further object of the present invention to provide novel lacquer compositions containing nitrocellulose and the rosin ester of TMC, the lacquer composition containing a high solids content and low viscosities and being capable of producing hard, flexible films of high gloss.

These and other objects will be more fully apparent from the following description of the invention.

As was pointed out above, the invention involves a lacquer composition containing nitrocellulose and a TMC-rosin ester. The rosin ester employed may be of a wide variety. In the first place, the term "rosin acid" as used herein is intended to include such substances as are included in wood or gum rosin, pine oleoresin, sapinic acid, pimaric acid, abietic acid, and, in general, all those substances ordinarily included in the term "gum colophony." There may also be used polymerized rosin, disproportionated rosin, hydrogenated rosin, and the rosin portions of tall oil and the like. These rosin substances may be used exclusively to esterify the TMC. This TMC-rosin ester may be replaced in whole or in part by other rosin TMC esters. Thus a mixture of rosin ester and the fatty acid ester of TMC may be used. Similarly, the TMC may be esterified with a mixture of rosin and fatty acids such as are found in tall oil or the rosin acid fraction of tall oil. Furthermore, alkyd-type resins prepared from TMC, rosin acids (or a mixture of rosin and fatty acids), and a polybasic acid or its anhydride may be used. It is therefore possible to modify the nitrocellulose with a wide variety of rosin derivatives of TMC. It is further possible to include in the formulation oil compositions prepared from TMC.

In regard to the proportions of TMC-rosin ester which may be used, it is preferred that the rosin ester may be used in quantities almost twice as great on a weight basis as the nitrocellulose employed. As a practical upper limit, 2.5 times as much TMC-rosin ester may be used as nitrocellulose—that is to say, 2.5 pounds of TMC-rosin ester per pound of nitrocellulose, without destroying the film-forming properties of the nitrocellulose or in any other way impairing the advantages explained above. As a lower limit of use, it is preferred to have present at least one-half as much TMC-rosin ester as nitrocellulose. In other words, in order to gain the advantages previously described, it is desirable to employ at least one pound of TMC-rosin ester for every two pounds of nitrocellulose used.

As indicated previously, maleic-modified TMC-rosin esters and TMC-rosin esters in which some or all of the ordinary rosin has been replaced by modified rosins or by fatty acids may be used. The proportions of these substances which may be used in lacquer compositions are similar to the proportions of straight TMC-rosin ester described above.

A wide variety of solvents may be used in these lacquer compositions. As a matter of fact, virtually any so-called lacquer solvent or auxiliary solvent may be employed. These include the ester solvents such as methyl acetate, ethyl acetate, butyl acetate, amyl acetate, ethyl propionate and the like, the ketone solvents such as acetone, methyl ethyl ketone, diethyl ketone, mesityl oxide, diacetone alcohol and the like, the hydrocarbons such as benzene, toluene, xylene, certain kerosene fractions and other aliphatic or alicyclic hydrocarbons and the like, the ethers such as ethyl ether, dioxane, dibutyl ether and the like, the ether alcohols such as Cellosolve, butyl Cellosolve, Carbitol and the like, and the nitroparaffins such as nitromethane, nitropropane and the like. Other solvents of importance not specifically mentioned above include hexyl acetate, octyl acetate, ethyl lactate, butyl lactate, and diethylacetamide.

The following examples will serve to illustrate the invention:

*Example 1*

TMC-rosin ester was prepared in the following manner: TMC (86 g.), WW gum rosin (450 g.) and zinc oxide (1.0 g.) was heated to 180° C. and then slowly to 285° C. over a period of three hours. An inert atmosphere of nitrogen covered the reaction mixture which was stirred throughout the entire reaction. The temperature was maintained at 285° C. for six hours, during the last two of which vacuum was applied. The product had the following properties:

Ball and ring melting point: 119–123.5° C.
Acid number: 26.7
Color: N

Three solutions (A, B, and C) were prepared having the following composition:

| | Parts |
|---|---|
| RS nitrocellulose ½ sec | 10.0 |
| Rosin ester | 8.0 |
| Dibutyl phthalate | 6.26 |
| Ethyl acetate | 12.0 |
| Butyl acetate | 24.0 |
| Toluene | 40.3 |

In solution A the rosin ester was the TMC-rosin ester prepared above. In solution B the rosin ester was ordinary ester gum having an acid number of 6.2, and a ball and ring softening point of 88–91° C. In solution C the rosin ester was pentaerythritol rosin ester having an acid number of 19, and a ball and ring melting point of 106° C.

Films of these solutions were cast on clean glass plates with a film applicator. The thickness of the films was approximately 0.003 inch. All the films dried rapidly since drying occurred by solvent evaporation. The properties of the films are tabulated below.

judged by slowly bending lacquer-covered tin plates over a ⅛" mandrel. If the film did not craze or fail in any way, it was said to pass the test.

In the following examples the rosin ester was entirely compatible and films were smooth, clear and glossy.

*Example 2*

A solution of the following composition was made.

| | | |
|---|---|---|
| RS nitrocellulose ½ sec | parts | 10.0 |
| TMC-rosin ester | do | 12.0 |
| Dibutyl phthalate | do | 6.5 |
| Ethyl acetate | do | 12.0 |
| Butyl acetate | do | 24.0 |
| Toluene | do | 40.3 |

Properties of film—
  Appearance: Clear, glossy film. Rosin ester entirely compatible.
  Film hardness:

| 24 hr. air dry | 72 hr. air dry |
|---|---|
| 36 | 52 |

Abrasion:
   Mg. lost in 300 cycles

| 24 hr. at 55° C. | 72 hr. at 55° C. |
|---|---|
| 14.3 | 26.0 |

Flexibility:
   Passes bending test over ⅛" mandrel

| 24 hr. air dry |
|---|
| Yes |

*Example 3*

A solution of the following composition was

| Film From— | Compatibility of rosin ester | Properties of film |
|---|---|---|
| Solution A | Completely compatible. | Description: clear, glossy film. Sward rocker hardness:<br><br>\| 24 hr. air dry \| 72 hr. air dry \|<br>\|---\|---\|<br>\| 34 \| 46 \|<br><br>Abrasion resistance ("Taber Abrasion Testor"):<br>Mg. lost in 300 cycles<br><br>\| 24 hr. at 55° C. \| 72 hr. at 55° C. \|<br>\|---\|---\|<br>\| 13.9 \| 23.5 \|<br><br>Flexibility: Film passes bending test over ⅛" mandrel after 24 hours' air dry. |
| Solution B | Completely compatible. | Description: clear, glossy film. Sward rocker hardness:<br><br>\| 24 hr. air dry \| 72 hr. air dry \|<br>\|---\|---\|<br>\| 21 \| 32 \|<br><br>Abrasion resistance ("Taber Abrasion Testor"):<br>Mg. lost in 300 cycles<br><br>\| 24 hr. at 55° C. \| 72 hr. at 55° C. \|<br>\|---\|---\|<br>\| 12.1 \| 23.4 \|<br><br>Flexibility: Passes bending test over ⅛" mandrel after 24 hrs. air dry. |
| Solution C | Slightly cloudy indicating incompatibility. | No tests since film was cloudy. |

The tests described above are standard for lacquer evaluation. Sward rocker is the usual apparatus for determining hardness of protective coating films. The "Taber Abrasion Testor" is a device in which lacquer-coated metal plates are placed on a turntable and subjected to the action of abrasive stones. The milligrams of film lost after a given number of revolutions is measured. In these tests CS–10 abrasive stones were used with two 1000 gram weights. Flexibility was made. In this and in the subsequent examples the rosin ester was entirely compatible and the films were smooth, clear and glossy.

10 parts RS nitrocellulose ½ sec.
16 parts TMC-rosin ester
6.90 parts tricresyl phosphate
12 parts ethyl acetate
24 parts butyl acetate
40.3 parts toluene Film hardness:

| 24 hr. air dry | 72 hr. air dry |
|---|---|
| 36 | 53 |

Abrasion:
Mg. lost in 300 cycles

| 24 hr. at 55° C. | 72 hr. at 55° C. |
|---|---|
| 20.3 | 23.2 |

Flexibility:
Passed bending test over ⅛" mandrel

| 24 hr. at 55° C. | 24 hr. air dry |
|---|---|
| Yes | Yes |

*Example 4*

A solution of the following composition was made.

10 parts RS nitrocellulose ½ sec.
16 parts TMC-rosin ester
8 parts tricresyl phosphate
12 parts ethyl acetate
24 parts butyl acetate
40.3 parts toluene Film hardness:

| 24 hr. air dry | 72 hr. air dry |
|---|---|
| 32 | 44 |

Abrasion:
Mg. lost in 300 cycles

| 24 hr. at 55° C. | 72 hr. at 55° C. |
|---|---|
| 20.7 | — |

Flexibility:
Passed bending test over ⅛" mandrel

| 1 hr. at 55° C. | 24 hr. air dry |
|---|---|
| Yes | Yes |

*Example 5*

A solution of the following composition was made.

10 parts RS nitrocellulose ½ sec.
16 parts TMC-rosin ester
10 parts tricresyl phosphate
12 parts ethyl acetate
24 parts butyl acetate
40.3 parts toluene Film hardness:

| 24 hr. air dry | 72 hr. air dry |
|---|---|
| — | 37 |

Abrasion:
Mg. lost in 300 cycles

| 24 hr. at 55° C. | 72 hr. at 55° C. |
|---|---|
| 15.7 | — |

Flexibility:
Passed bending test over ⅛" mandrel

| 24 hr. air dry | 24 hr. at 55° C. |
|---|---|
| Yes | Yes |

*Example 6*

A solution of the following composition was made.

10 parts RS nitrocellulose ½ sec.
16 parts TMC-rosin ester
6.9 parts dibutyl phthalate
12 parts ethyl acetate
24 parts butyl acetate
40.3 parts toluene Film hardness:

| 24 hr. air dry | 72 hr. air dry |
|---|---|
| 48 | 64 |

Abrasion:
Mg. lost in 300 cycles

| 24 hr. at 55° C. | 72 hr. at 55° C. |
|---|---|
| 24.6 | 28.9 |

Flexibility: Passed bending test over ⅛" mandrel after 24 hr. air dry

When ester gum was used in the high proportions shown in Examples 3-6, soft mushy films of no utility resulted.

While dibutyl phthalate and tricresyl phosphate have been used as the plasticizers in the above examples, their use was for direct comparison purposes. It is apparent that any conventional plasticizer compatible with nitrocellulose and TMC-rosin ester may be used. Such plasticizers include: diethyl phthalate, dimethyl phthalate, diphenyl phthalate, butyl benzyl phthalate, dioctyl phthalate, ethyl phthalyl ethyl glycollate, butyl phthalyl butyl glycollate, triphenyl phosphate, alkyl aryl phosphates, N-ethyl p-toluenesulfonamide, o- or p-toluenesulfonamide, N-cyclohexyl p-toluenesulfonamide, o-nitro biphenyl, chlorinated tricresyl phosphates, tributoxy ethyl phosphate, triethyleneglycol di-2-ethyl butyrate, polyethyleneglycol ester of mixed fatty acids, triethyleneglycol dipelargonate, dipentaerythritol hexapropionate, pentaerythritol tetraacetate, trialkyl citrates, polyesters of sebacic acid, alkyl resins in general, particularly castor oil modified alkyd resins, castor oil, and blown castor oil.

The quantity of plasticizer which is used may be varied as is shown in the examples. Any desirable quantity of the plasticizer may be employed as is well understood by those skilled in the art. It may be observed from the examples that these plasticizers may be used in large quantities without appreciably affecting the hardness of the film.

We claim as our invention:

1. A lacquer composition comprising nitrocellulose, a nitrocellulose solvent, a plasticizer and a rosin acid ester of 2,2,6,6-tetramethylol-cyclohexanol.

2. A lacquer composition comprising nitrocellulose, a nitrocellulose solvent, a plasticizer and a rosin acid ester of 2,2,6,6-tetramethylolcyclohexanol, the rosin acid ester being employed in the range of from about one-half to two and one-half parts per part of nitrocellulose.

3. A lacquer composition comprising nitrocellulose, a nitrocellulose solvent, a plasticizer and a rosin acid ester of 2,2,6,6-tetramethylolcyclohexanol, the rosin acid ester being almost two parts per part of nitrocellulose.

4. A lacquer composition according to claim 1 in which the rosin acid ester is derived from the mixed acids of tall oil.

5. A lacquer composition according to claim 1 in which the rosin acid ester is derived from the rosin acid fraction of tall oil.

6. A lacquer composition according to claim 1 in which the rosin acid ester is the ester of 2,2,6,6-tetramethylolcyclohexanol rosin acids and an alkyd resin-forming polybasic acid.

HAROLD WITTCOFF.
WESLEY A. JORDAN.

REFERENCES CITED

The following references are of record in the file of this patent:

UNITED STATES PATENTS

| Number | Name | Date |
|---|---|---|
| 2,066,759 | Bent | Jan. 5, 1937 |
| 2,275,494 | Bennett | Mar. 10, 1942 |
| 2,404,033 | Burrell | July 16, 1946 |
| 2,470,964 | Wittcoff | May 24, 1949 |

FOREIGN PATENTS

| Number | Country | Date |
|---|---|---|
| 486,923 | Great Britain | June 7, 1938 |